(12) United States Patent
Huckaby

(10) Patent No.: US 12,283,798 B1
(45) Date of Patent: Apr. 22, 2025

(54) ELECTRICAL PANEL WITH ARC PREVENTION MEMBER

(71) Applicant: Charles Wade Huckaby, Arcadia, FL (US)

(72) Inventor: Charles Wade Huckaby, Arcadia, FL (US)

( * ) Notice: Subject to any disclaimer, the term of this patent is extended or adjusted under 35 U.S.C. 154(b) by 175 days.

(21) Appl. No.: 18/094,354

(22) Filed: Jan. 7, 2023

(51) Int. Cl.
*H02B 1/46* (2006.01)

(52) U.S. Cl.
CPC .................... *H02B 1/46* (2013.01)

(58) Field of Classification Search
None
See application file for complete search history.

(56) References Cited

U.S. PATENT DOCUMENTS

| | | | | |
|---|---|---|---|---|
| 1,089,335 A * | 3/1914 | Chesser | ............... | H02B 1/46 220/324 |
| 2,871,284 A * | 1/1959 | Wills | ............... | H02B 1/42 361/652 |
| 3,021,581 A * | 2/1962 | Cook | ............... | H01R 4/64 24/561 |
| 3,992,897 A * | 11/1976 | Loos | ............... | H01R 4/48 62/262 |
| 9,018,523 B1 * | 4/2015 | Lehman | ............... | H02B 1/14 174/138 E |
| 2013/0194727 A1 * | 8/2013 | Myers | ............... | H02G 3/125 361/641 |
| 2018/0109080 A1 * | 4/2018 | King | ............... | H02B 1/012 |

* cited by examiner

*Primary Examiner* — Krystal Robinson
(74) *Attorney, Agent, or Firm* — Gulf Coast Intellectual Property Group

(57) ABSTRACT

An electrical panel having an arc prevention member wherein the arc prevention member inhibits exposed wire from contacting the inner surface of the sidewall of the panel box. The present invention includes a panel box having four side walls and a rear wall forming an interior volume operable to receive conventional electrical components therein. The electrical panel of the present invention includes an arc prevention member operably coupled to the side wall. The arc prevention member includes an upper portion and a lower portion contiguously formed. The upper portion is formed from a first segment and second segment having a void therebetween that is configured to couple to an edge of the side wall. The lower portion is integrally formed with the upper portion and extends outward therefrom into the interior volume of the panel box. The lower portion is arcuate in form.

1 Claim, 2 Drawing Sheets

ELECTRICAL PANEL WITH ARC PREVENTION MEMBER

FIELD OF THE INVENTION

The present invention relates generally to an electrical breaker panel, more specifically but not by way of limitation, an electrical breaker panel having an arc prevention member operable to inhibit exposed wire contacting the inner side walls of the breaker panel.

BACKGROUND

The primary circuit breaker panel is a device that distributes the power supply to a structure in which it is installed such as a residential home. The circuit breaker box contains a plurality of breakers and breakers serve to make sure of electrical safety as well as distribute electricity to various areas of the home. The power that flows from the electricity provider's line goes through the line meter and into the main circuit breaker panel. The circuit breaker panel has been designed to have safety features that safeguard the wiring and prevent electrical shocks and fires caused by overloading or the build-up of heat. These safety mechanisms also protect your residence and your family from the hazards of improper grounding, voltage fluctuations and other potential issues.

This main circuit breaker switch regulates the current flow from the provider to the entire breaker panel. Breakers are subdivided into two categories. Single-Pole breakers are usually between 15-20 amps and can take on up to 120 volts. Double-Pole breakers can handle larger amperage loads and can take on 240 volts. Double-pole breakers are typically deployed for large appliances such as air conditioners and water heaters. Breaker panels are equipped with bus bars in the main circuit breaker panel. This is where the current flows from the main breaker to the dividing circuits and extends to the outlet. May times during connecting wire to the bus bar the exposed wire will contact the side of the breaker panel at the same time as being in contact with the bus bar. This results in an arc or short which can be very dangerous to the individual and further results in damage to the panel.

It is intended within the scope of the present invention to provide an electrical breaker panel that is configured to inhibit exposed wire from contacting the inner side wall of the breaker panel.

SUMMARY OF THE INVENTION

It is the object of the present invention to provide an electrical panel operable to inhibit exposed wire from contacting the inner side wall of the breaker panel wherein the electrical panel includes four wall members and a rear wall member forming an interior volume.

Another object of the present invention is to provide an electrical panel operable to distribute electrical power in a structure wherein the panel of the present is configured to have operably coupled thereto single pole breakers and double pole breakers.

A further object of the present invention is to provide an electrical panel operable to inhibit exposed wire from contacting the inner side wall of the electrical panel wherein the present invention includes an arc prevention member.

Still another object of the present invention is to provide an electrical panel operable to distribute electrical power in a structure wherein the arc prevention member is secured to a longitudinal side wall of the electrical panel.

An additional object of the present invention is to provide an electrical panel operable to inhibit exposed wire from contacting the inner side wall of the electrical panel wherein the arc prevention member includes a body having an upper portion and a lower portion.

Yet a further object of the present invention is to provide an electrical panel operable to distribute electrical power in a structure wherein the upper portion of the body is configured to operably couple to a longitudinal side wall.

Another object of the present invention is to provide an electrical panel operable to inhibit exposed wire from contacting the inner side wall of the electrical panel wherein the lower portion of the body of the arc prevention member is arcuate in form.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
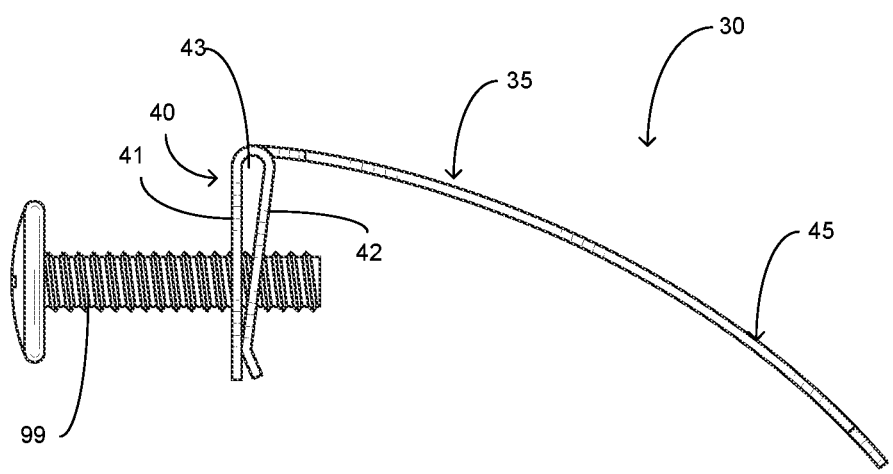
FIG. 1 is a side view of the arc prevention member of the present invention.
Figure 2:
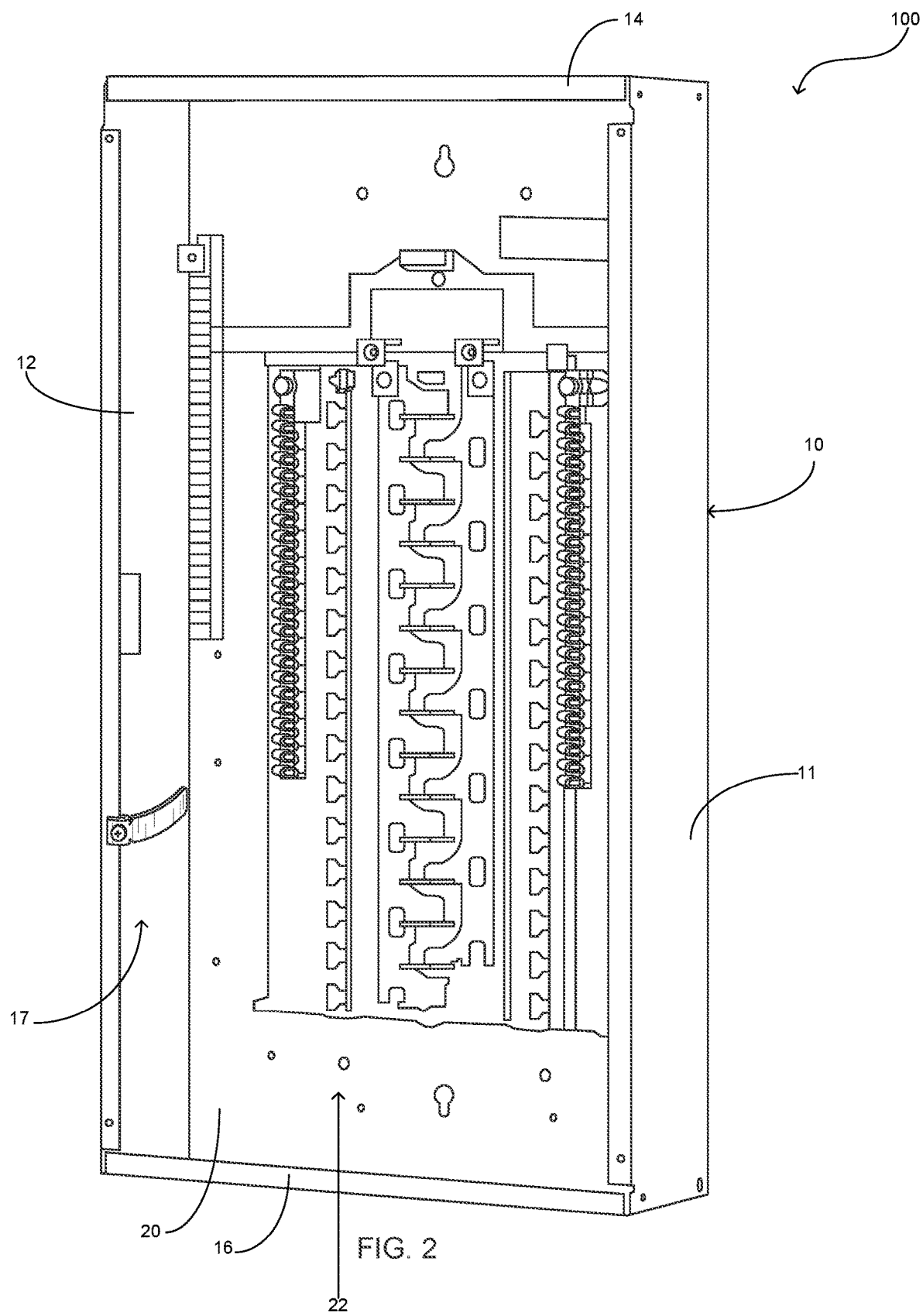
FIG. 2 is a detailed view of the electrical panel of the present invention with the arc prevention member.

Referring now to the drawings submitted herewith, wherein various elements depicted therein are not necessarily drawn to scale and wherein through the views and figures like elements are referenced with identical reference numerals, there is illustrated an electrical panel with arc prevention member 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figure submitted herewith, the electrical panel with arc prevention member 100 includes panel box 10 wherein the panel box 10 is manufactured from a suitable rigid material such as but not limited to metal. Wherein the panel box 10 includes longitudinal sidewalls 11,12 and an upper lateral wall 14 and a lower lateral wall 16. The longitudinal sidewalls 11,12 and the upper lateral wall 14 and lower lateral wall 16 are formed with the rear wall 20 to create an interior volume 22. The interior volume 22 is configured to have mounted therein conventional electrical components such as but not limited to neutral bus bars, breaker switch buses, single pole breaker switches and double-pole breaker switches. It should be understood within the scope of the present invention that the panel box 10 could be provided in numerous alternate sizes in order to have different capacities for intended applications.

Secured to the longitudinal sidewall 11 is the arc prevention member 30. The arc prevention member 30 is secured to the longitudinal sidewall 11 utilizing suitable techniques such as but not limited to a screw. The arc prevention member 30 is configured to inhibit an exposed wire from contacting the inner surface 17 of the longitudinal sidewall 11 so as to prevent a potential electrical arc or short resulting from a live electrical wire contacting the inner surface 17. The arc prevention member 30 includes a body 35 wherein the body 35 has an integrally formed upper portion 40 and lower portion 45. The upper portion 40 includes first segment 41 and second segment 42 being contiguously formed having a void 43 therebetween. The void 43 is sufficient in width to receive a portion of the longitudinal sidewall 11 therein in order to facilitate operable coupling therewith. The first segment 41 and second segment 42 have an aperture (not particularly illustrated herein) formed therethrough in order to receive exemplary screw 99 which is employed to secure the arc prevention member 30 to the longitudinal sidewall 11.

The body 35 of the arc prevention member 30 includes lower portion 45. Lower portion 45 is integrally formed with the upper portion 40 and extends outward therefrom. The lower portion 45 is arcuate in shape and extends inward into the interior volume 22 adjacent the inner surface 17. The arcuate shape of the lower portion 45 provides the necessary shape that facilitates an ability for a user of the panel box 10 to access interior components without interference from the arc prevention member 30. The lower portion 45 is flat in manner and has a width ranging from one quarter to one half inch. The radius of the lower portion 45 shapes the lower portion 45 inwards towards the longitudinal sidewall 11.

It should be understood within the scope of the present invention that the arc prevention member 30 could be installed on either longitudinal sidewall 11, 12. Furthermore, it should be understood within the scope of the present invention that more than one arc prevention member 30 could be installed on the panel box 10.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An electrical panel box operable to inhibit unintended electrical arcs comprising:
   a panel box, said panel box having a first longitudinal sidewall and a second longitudinal sidewall, said first longitudinal sidewall having a front edge, said second longitudinal sidewall having a front edge, the panel box further having an upper lateral wall and a lower lateral wall, a rear wall is present and integrally formed with the first longitudinal sidewall, the second longitudinal sidewall, the upper lateral wall and the lower lateral wall to form an interior volume of the panel box; and
   an arc prevention member, said arc prevention member being secured to said panel box, said arc prevention member having an upper portion and a lower portion, said lower portion being integrally formed with said upper portion extending outward therefrom, said lower portion having a first end and a second end, said first end of said lower portion being integrally formed with said upper portion, wherein the upper portion of the at least one arc prevention member includes a first segment and a second segment, said first segment and said second segment being contiguously formed, said first segment and said second segment being adjacent and wherein said upper portion includes a void, said void being between said first segment and said second segment, wherein the upper portion of the at least one arc prevention member is operably coupled with the front edge of the first longitudinal sidewall and said second end of said lower portion being distal to said upper portion and proximate said rear wall so as to extend substantially the width of the first longitudinal sidewall.

* * * * *